US011783593B2

(12) United States Patent
Guizilini et al.

(10) Patent No.: US 11,783,593 B2
(45) Date of Patent: *Oct. 10, 2023

(54) MONOCULAR DEPTH SUPERVISION FROM 3D BOUNDING BOXES

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,918

(22) Filed: Jun. 2, 2022

(65) Prior Publication Data

US 2022/0292837 A1   Sep. 15, 2022

Related U.S. Application Data

(63) Continuation of application No. 16/909,907, filed on Jun. 23, 2020, now Pat. No. 11,398,095.

(51) Int. Cl.
| | |
|---|---|
| *G06V 20/56* | (2022.01) |
| *G06T 7/50* | (2017.01) |
| *G06V 40/10* | (2022.01) |
| *G06V 10/75* | (2022.01) |
| *G06F 18/214* | (2023.01) |

(52) U.S. Cl.
CPC ............ *G06V 20/56* (2022.01); *G06F 18/214* (2023.01); *G06T 7/50* (2017.01); *G06V 10/751* (2022.01); *G06V 40/10* (2022.01); *G06T 2207/10028* (2013.01)

(58) Field of Classification Search
CPC ...................................... G06V 20/56
See application file for complete search history.

(56) References Cited

U.S. PATENT DOCUMENTS

| | | | |
|---|---|---|---|
| 11,398,095 B2 | 7/2022 | Guizilini et al. | |
| 11,555,903 B1* | 1/2023 | Kroeger | G01S 17/89 |
| 11,567,497 B1* | 1/2023 | Foster | G01S 17/89 |
| 2021/0046861 A1* | 2/2021 | Li et al. | G06F 18/24155 |

* cited by examiner

*Primary Examiner* — Oneal R Mistry
(74) *Attorney, Agent, or Firm* — SEYFARTH SHAW LLP

(57) ABSTRACT

A method for navigating a vehicle through an environment includes assigning a first weight to each pixel associated with a dynamic object and assigning a second weight to each pixel associated with a static object. The method also includes generating a dynamic object depth estimate for the dynamic object and generating a static object depth estimate for the static object, an accuracy of the dynamic object depth estimate being greater than an accuracy of the static object depth estimate. The method still further includes generating a 3D estimate of the environment based on the dynamic object depth estimate and the static object depth estimate. The method also includes controlling an action of the vehicle based on the 3D estimate of the environment.

20 Claims, 7 Drawing Sheets

MONOCULAR DEPTH SUPERVISION FROM 3D BOUNDING BOXES

CROSS-REFERENCE TO RELATED APPLICATION

The present application is a continuation of U.S. patent application Ser. No. 16/909,907, filed on Jun. 23, 2020, and titled "MONOCULAR DEPTH SUPERVISION FROM 3D BOUNDING BOXES," the disclosure of which is expressly incorporated by reference in its entirety.

BACKGROUND

Field

Certain aspects of the present disclosure generally relate to depth estimation systems.

Background

Autonomous agents (e.g., vehicles, robots, etc.) rely on depth estimates for performing various tasks. These various tasks may include constructing a three-dimensional (3D) representation of a surrounding environment or identifying 3D objects. The 3D representation may be used for various tasks, such as localization and/or autonomous navigation. Improving an accuracy of depth estimates may improve an accuracy of downstream tasks, such as generating 3D representations or 3D object detection. It is desirable to improve the accuracy of depth estimates obtained from images captured by a sensor of the autonomous agent.

SUMMARY

In one aspect of the present disclosure, a method is disclosed. The method includes capturing a two-dimensional (2D) image of an environment adjacent to an ego vehicle. The environment includes, at least, a dynamic object and a static object. The method also includes generating, via a depth estimation network, a depth map of the environment based on the 2D image. An accuracy of a depth estimate for the dynamic object in the depth map is greater than an accuracy of a depth estimate for the static object in the depth map. The method further includes generating a three-dimensional (3D) estimate of the environment based on the depth map. The method still further includes controlling an action of the ego vehicle based on the identified location.

In another aspect of the present disclosure, a non-transitory computer-readable medium with non-transitory program code recorded thereon is disclosed. The program code is executed by a processor and includes program code to capturing a 2D image of an environment adjacent to an ego vehicle, the environment comprising at least a dynamic object and a static object. The program code also includes program code to generate, via a depth estimation network, a depth map of the environment based on the 2D image. An accuracy of a depth estimate for the dynamic object in the depth map is greater than an accuracy of a depth estimate for the static object in the depth map. The program code further includes program code to generate a 3D estimate of the environment based on the depth map. The program code still further includes program code to control an action of the ego vehicle based on the identified location.

Another aspect of the present disclosure is directed to an apparatus. The apparatus having a memory, one or more processors coupled to the memory, and instructions stored in the memory. The instructions being operable, when executed by the processor, to cause the apparatus to capturing a 2D image of an environment adjacent to an ego vehicle, the environment comprising at least a dynamic object and a static object. The instructions also cause the apparatus to generate, via a depth estimation network, a depth map of the environment based on the 2D image. An accuracy of a depth estimate for the dynamic object in the depth map is greater than an accuracy of a depth estimate for the static object in the depth map. The instructions additionally cause the apparatus to generate a 3D estimate of the environment based on the depth map. The instructions further cause the apparatus to control an action of the ego vehicle based on the identified location.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may perform various tasks based on depth estimates. For example, the agent may generate a 3D representation of a scene based on images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation. Additionally, or alternatively, the agent may identify 3D objects based on the depth estimates.

An artificial neural network, such as a depth network may be trained to estimate depth from sensor measurements. Conventional systems for depth training emphasize depth performance as opposed to improving downstream tasks, such as 3D object detection. The depth training refers to a training stage for training the depth network to estimate depth from images. Aspects of the present disclosure are directed to improving depth estimates for downstream tasks by incorporating 3D object detection information as part of a training loss for the depth training.

Figure 1:
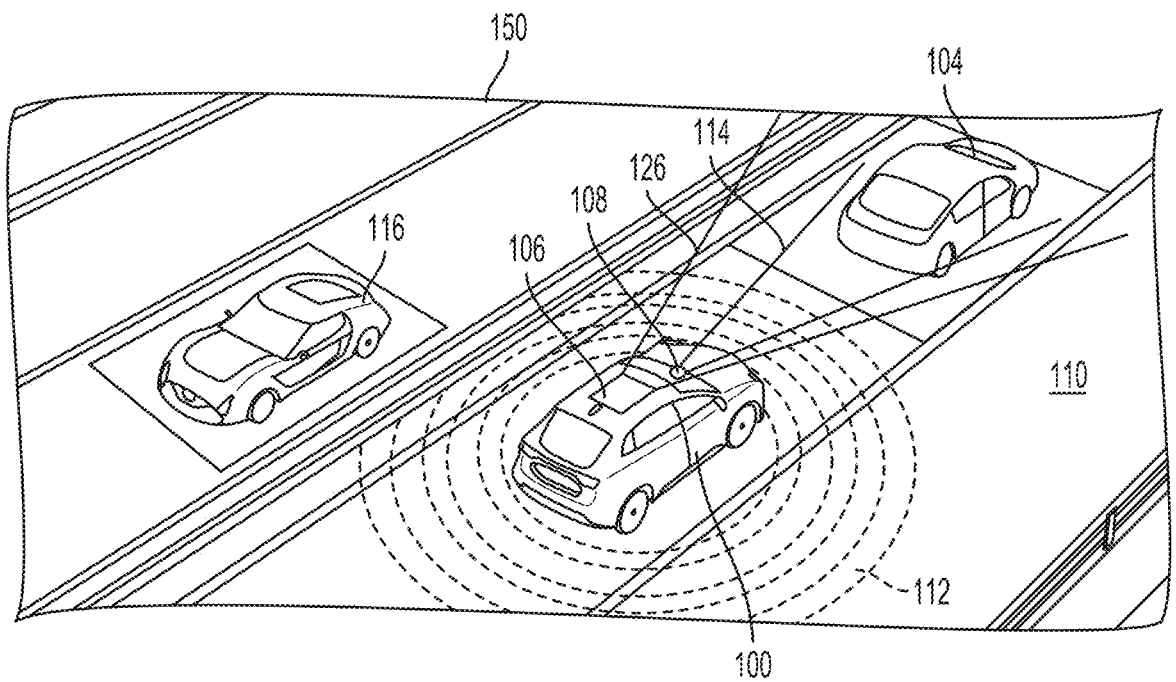
FIG. 1 illustrates an example of a vehicle in an environment according to aspects of the present disclosure.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the second sensor 106 and the 2D camera 108 may be used to navigate the ego vehicle 100 along a route when the ego vehicle 100 is in an autonomous mode. The second sensor 106 and the 2D camera 108 may be powered from electricity provided from the vehicle's 100 battery (not shown). The battery may also power the vehicle's motor. The information obtained from the second sensor 106 and the 2D camera 108 may be used to generate a 3D representation of an environment.

Aspects of the present disclosure improve depth estimations for objects in an environment. The improved depth estimations may improve downstream tasks, such as 3D object detection. Downstream tasks may refer to tasks performed based on the depth estimates. In some implementations, ground-truth points corresponding to an object may be selected based on 3D bounding box information. A weight for each ground-truth point (e.g., pixel) corresponding to the object may be increased. The depth network improves depth estimates for the object as a result of the increased weights.

The improved depth estimates may refer to depth estimates with increased accuracy. The objects may include objects that are not prominent in input images, such as cars and pedestrians. Improving an accuracy for depth estimates of objects that are not prominent in input images may come at the expense of an accuracy of depth estimates for representative objects that are prominent in input images, such as roads and buildings. Improving the accuracy for depth estimates of objects that are not prominent in input images improves models for downstream tasks, such as 3D object detection, because identification of the objects may be improved.

Supervised monocular depth networks learn an estimation function by regressing input images to estimated depth outputs. Supervised training refers to learning from labeled ground-truth information. For example, conventional supervised monocular depth networks may use ground truth depth (e.g., LIDAR data) to train a neural network as a regression model. In a supervised depth network, a convolutional neural network generates an initial coarse prediction and refines the prediction using another neural network to produce more accurate results. As supervised techniques for depth estimation advance, the availability of target depth labels is reduced due to the costs of generating labeled data. For example, labeling outdoor scenes is a time consuming task.

Some conventional monocular depth solutions substitute LiDAR information with vision-based information. That is, instead of using point-clouds directly from LiDAR, a depth network estimates point-clouds from single images. In such examples, the conventional monocular depth solution uses the estimated point-clouds for 3D bounding box detection. As described, cameras (e.g., vision-based systems) are ubiquitous in most systems and less costly in comparison to LiDAR sensors. Therefore, camera-based solutions may be applied to a wider range of platforms. Still, LiDAR systems perform better than vision-based systems. Improving the accuracy of depth estimation networks may reduce the gap between LiDAR systems and vison-based systems. Conventional systems may also reduce the gap between LiDAR systems and vision-based systems by including information from a sparse LiDAR sensor at training and test time. The sparse LiDAR information may correct misalignments. These conventional systems reduce the use of LiDAR information.

Due to their cost, LIDAR sensors may not be economically viable. Cameras, such as a red-green-blue (RGB) camera, may provide dense information. Additionally, cameras may be more economically viable in comparison to LIDAR sensors. Aspects of the present disclosure improve monocular depth estimates generated from a depth network trained in a supervised manner. Improved monocular depth estimates bridge a gap between LIDAR and vision solutions, such that cameras may augment, complement, or substitute range sensors. In some implementations, depth training (e.g., training for image-based depth estimation) may be self-supervised by bootstrapping geometric constraints inherent in robots, or via sparse depth labels from calibrated LiDAR sensors.

Bridging a gap between depth estimates from monocular cameras and depth estimates from LiDAR sensors may reduce costs and increase robust solutions, because cameras complement the functions of range sensors. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, agents may produce a greater amount of image data in comparison to LIDAR data. The image data may be used as training data for a depth network. As such, the use of a monocular sensor may increase an amount of training data, thereby improving self-supervised monocular depth estimates.

As described, aspects of the present disclosure improve 3D object detection from monocular images (e.g., pseudo-LiDAR point-clouds). 3D object detection is a component for enabling autonomous navigation by an autonomous agent. Currently, LiDAR information by be used for 3D object detection. It is desirable to improve the 3D object detection by processing monocular point-clouds rather than LiDAR information.

Accurate depth estimates may improve autonomous navigation through an environment. For example, accurate depth estimates may improve collision avoidance with objects, such as cars or pedestrians. Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

In some examples, conventional systems obtain pseudo-point-clouds generated by pre-trained depth networks. The pre-trained depth networks transform input images into the information necessary for 3D bounding box detection (e.g., pseudo-point-clouds). The pre-trained depth networks include monocular, stereo, or multi-view networks, trained in a semi-supervised or supervised fashion. The pre-trained depth networks may be generic depth networks that are not trained for a specific task. The pre-trained depth network may be referred to as an off-the-shelf network.

The pre-trained depth networks may learn strong priors of the environment (e.g., ground-plane, vertical walls, structures). The learned priors may improve overall depth results. Still, the learned priors do not improve depth estimates for objects that are relevant for 3D object detection. Objects that are relevant for 3D object detection are often dynamic objects, such as cars and pedestrians. As is known to those of skill in the art, dynamic objects are a difficult problem for monocular depth estimation in a semi-supervised setting. For example, a dynamic object's motion violates a static world assumption that forms a basis for a photometric loss that is used for training the depth network.

As described, conventional off-the-shelf depth networks are trained using metrics and losses that differ from a downstream task, such as 3D object detection. Thus, conventional off-the-shelf depth networks may reduce an accuracy for a relevant task. For example, conventional off-the-shelf depth networks may accurately recover a ground-plane because the ground-plane covers a large portion (e.g., a large number of pixels) in the image. In contrast, a number of pixels representing pedestrians may be less than the number of pixels representing the ground-plane, such as the road. Therefore, pedestrians may be less relevant for depth estimates because a goal of the monocular depth network is to maximize the accuracy of predictions of all pixels.

Rather than using an off-the-shelf depth network developed to only depth estimates, aspects of the present disclosure train a depth network to improve a downstream task, such as 3D object detection. In some implementations, 3D object detection information may be incorporated as part of a training loss for depth training. The 3D object detection information may be specified for training the downstream task training. Therefore, the 3D object detection information is already available to the depth network. Conventional systems do not use such information for depth training.

In some implementations, if 3D bounding box information is not available at training time, the depth network reverts back to depth training without 3D bounding box information. As such, the training stage may learn from images with 3D bounding boxes and images without annotated 3D bounding boxes. Such implementations increase the depth training's flexibility to use different sources of information, such that available labels are not discarded.

In some implementations, based on the training, the depth network performs depth estimates based on an input image at test time. That is, although the depth network was trained using 3D bounding box information and, if available, ground-truth depth information. The depth network may only use the input image for depth estimates at test time.

Figure 2A:
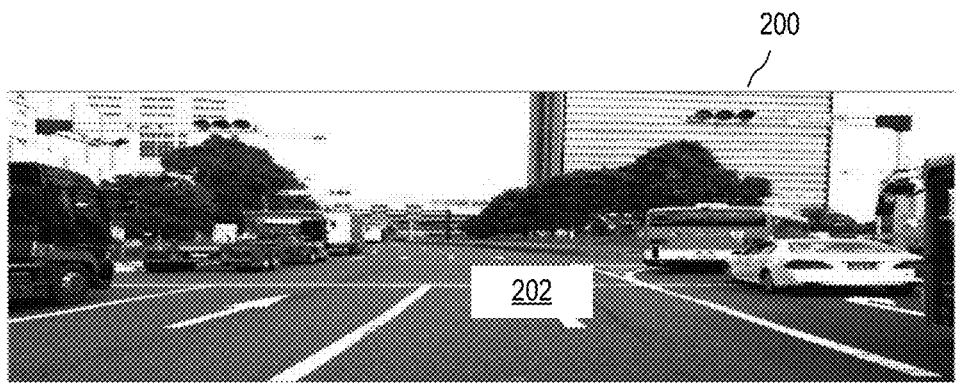
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
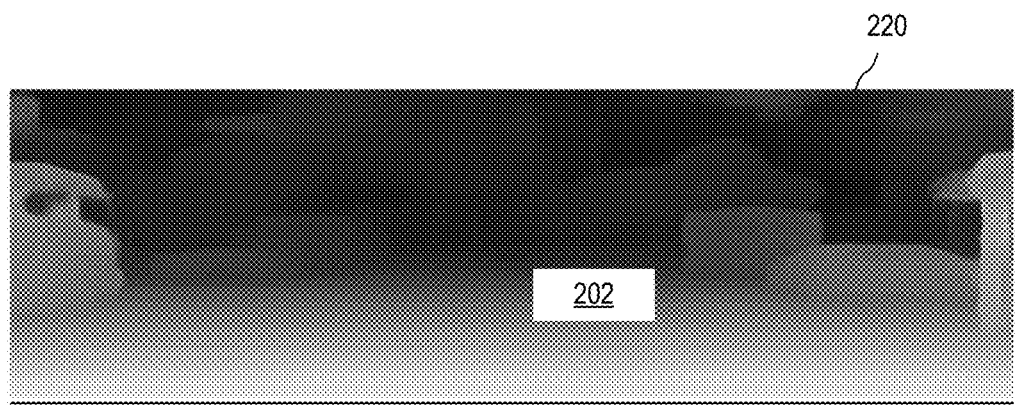
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
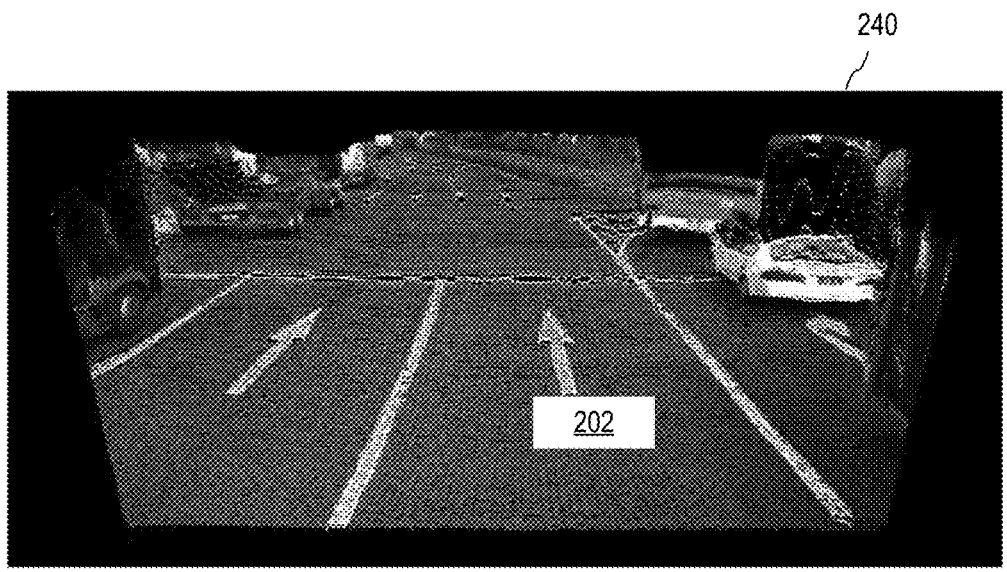
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

Figure 3:
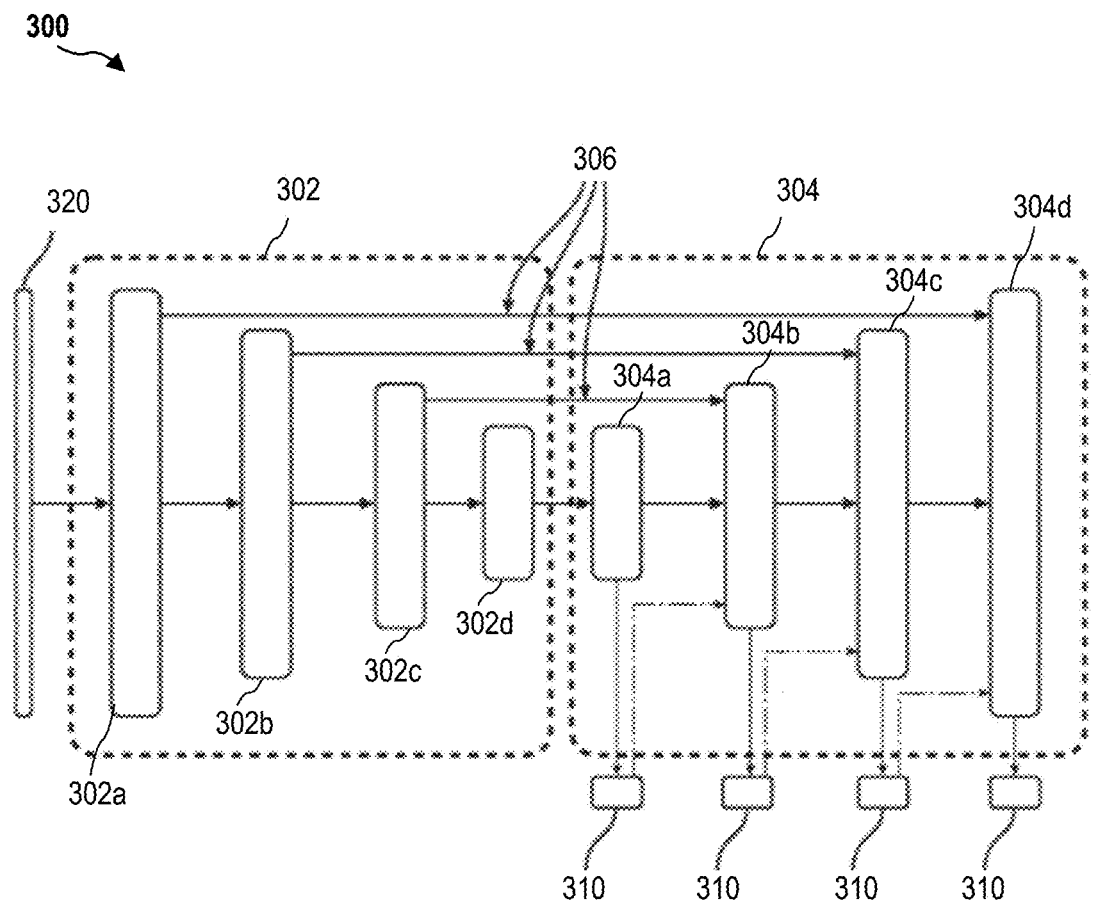
FIG. 3 illustrates an example of a depth network according to aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2B, of an input image 320.

The encoder 302 includes multiple encoder layers 302a-d. Each encoder layer 302a-d may be a packing layer for downsampling features during the encoding process. The decoder 304 includes multiple decoder layers 304a-d. In FIG. 3, each decoder layer 304a-d may be an unpacking layer for upsampling features during the decoding process. That is, each decoder layer 304a-d may unpack a received feature map.

Skip connections 306 transmit activations and gradients between encoder layers 302a-d and decoder layers 304a-d. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 302a-d may generate intermediate inverse depth maps 310. Each intermediate inverse depth map 310 may be upsampled before being concatenated with a corresponding skip connection 306 and feature maps unpacked by a corresponding decoder layer 302a-d. The inverse depth maps 310 also serve as the output of the depth network from which the loss is calculated. In contrast to conventional systems that incrementally super-resolve each inverse depth map 310. Aspects of the present disclosure upsample each inverse depth map 310 to a highest resolution using bilinear interpolation. Upsampling to the highest resolution reduces copy-based artifacts and photometric ambiguity, thus improving depth estimates.

Figure 4:
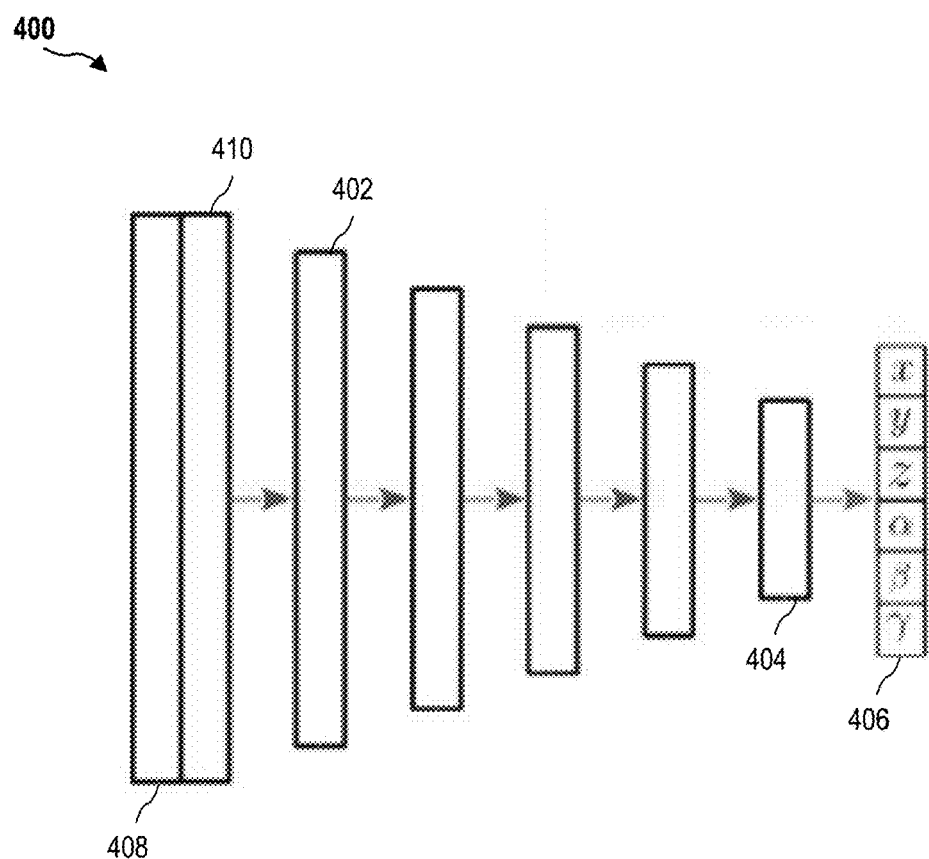
FIG. 4 illustrates an example of a pose network according to aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks. In conventional systems, the explainability mask removes objects that do not conform to a static world assumption.

As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel layer 406 may be a six-channel layer.

In one configuration, a target image ($I_t$) 408 and a source image ($I_s$) 410 are input to the pose network 400. The target image 408 and source image 410 may be concatenated together, such that the concatenated target image 408 and source image 410 are input to the pose network 400. During training, one or more source images 410 may be used during different training epochs. The source images 410 may include an image at a previous time step (t−1) and an image at a subsequent time step (t+1). The output is the set of six degrees of freedom (DoF) transformations between the target image 408 and the source image 410. The process may be repeated for each source image 410 if more than one source image 410 is considered.

Different training approaches may be used to train a monocular depth estimation network. The training approaches may include, for example, supervised training, semi-supervised training, and self-supervised training. Supervised training refers to training a network to regress ground-truth depth information by applying a loss such as an L1 loss (e.g., absolute error). In self-supervised training, depth information and pose information are warped to generate a reconstructed image (e.g., 3D representation of a 2D image). A photometric loss minimizes a difference between the original images and the reconstructed images. Semi-supervised training may be a combination of self-supervised and supervised training.

As described, in some implementations, ground-truth points corresponding to a first set of objects in an image are weight more than ground-truth points corresponding to a second set of objects in the image. The set of objects may be determined based on a desired task. For example, for 3D object detection, the first set of objects may be dynamic objects and/or objects with a lower occurrence rate in input images. As an example, the first set of objects may include vehicles and/or pedestrians. Additionally, the second set of objects may be static objects and/or objects with a greater occurrence rate in input images. As an example, the second set of objects may include buildings, roads, and/or sidewalks. In most cases, a series of images includes more occurrences of buildings, roads, and/or sidewalks in comparison to occurrences of people and/or vehicles.

Aspects of the present disclosure augment monocular depth estimation training data with 3D bounding boxes. The 3D bounding boxes may be used in addition to depth information at training time. That is, the monocular depth network may be trained with 3D bounding boxes and ground-truth depth information.

In one configuration, weights of pixels within a 3D bounding box are adjusted. Pseudo-point-clouds may be generated by increasing the relevancy of pixels within the 3D bounding box. Increasing the weights (e.g., relevancy) of the pixels may decrease depth metrics. Still, increasing the weights of pixels improves 3D object detection.

The 3D object detection may be improved by focusing on portions of an image deemed relevant for the assigned task (e.g., 3D object detection). That is, a depth network may be trained for a 3D object detection task. The task specific training is in contrast to conventional systems that use pre-trained generic depth networks that were not conceptualized or trained for a specific task.

Aspects of the present disclosure may improve supervised training, self-supervised training, and semi-supervised training. For supervised training, a different weight may be applied for image pixels that contain ground-truth information. These pixels may be identified from an annotated depth map. For example, the depth map may be annotated by a bounding box. A weight for pixels within the bounding box may be adjusted.

Figure 5:
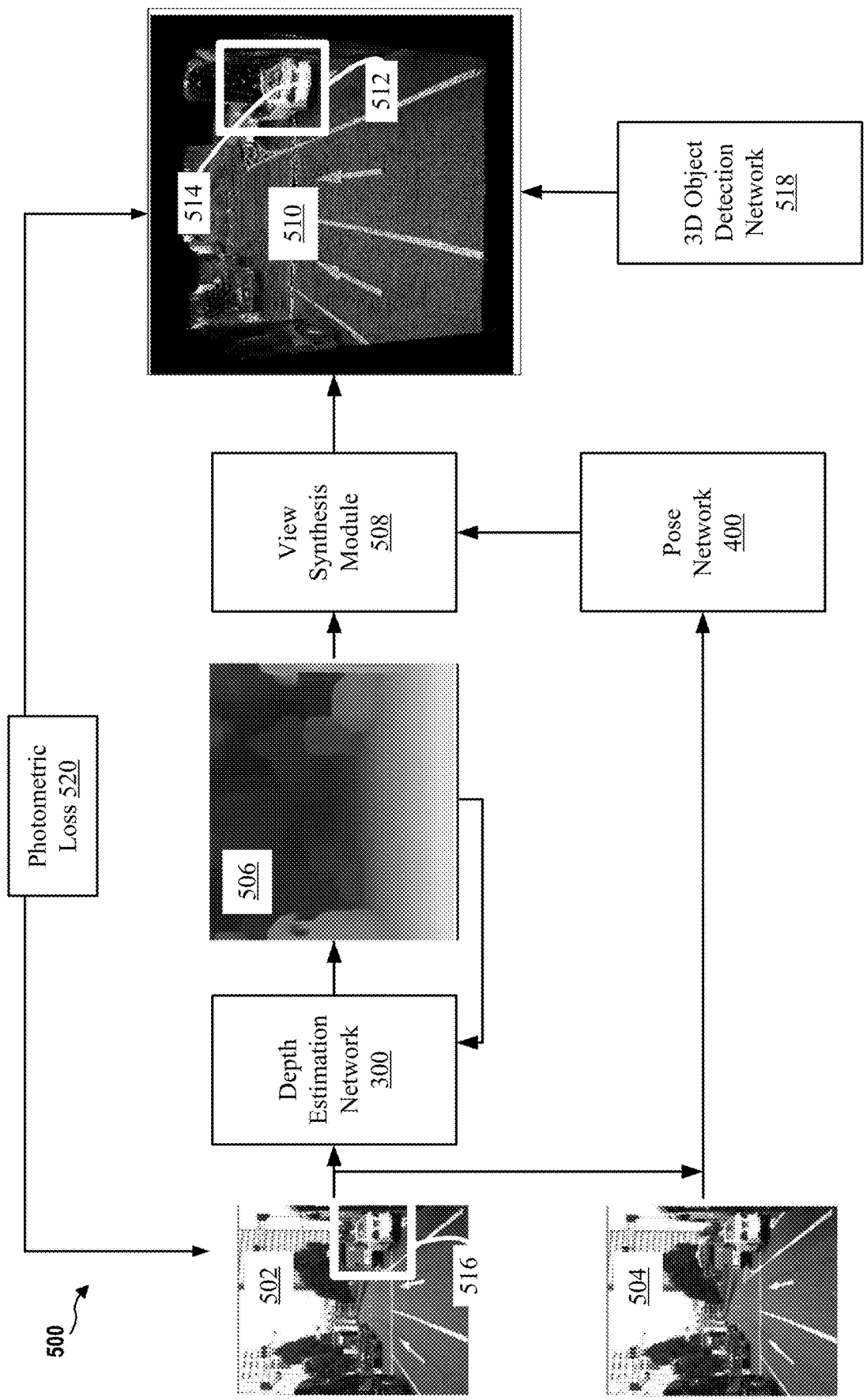
FIG. 5 illustrates an example of a training pipeline according to aspects of the present disclosure.

In some aspects, for self-supervised training, 3D bounding boxes are projected back to the input image, producing a 2D projection. A different weight may be applied to the pixels that fall within the 2D reprojected bounding box. FIG. 5 illustrates an example training pipeline 500 for training a depth estimation network 504 according to aspects of the present disclosure. As shown in FIG. 5, the depth estimation network 300, as described in FIG. 3, may generate a depth estimate 506 from a two-dimensional input image 502. The training pipeline 500 is not limited to using the depth estimation network 300 as described in FIG. 3, other types of depth estimation neural network may be implemented.

The depth estimation network 504 may be used by a view synthesis module 508 to generate a reconstructed image 510 (e.g., warped source image). In some implementations, the current image 502 and a source image 504 are input to the pose network, as described in FIG. 4, to estimate a pose of the sensor (e.g., monocular camera). The current image 502 may be an image at time step t and the source image 502 may be an image at time step t−1. The view synthesis module 508 may generate the reconstructed image 510 based on the estimated depth and the estimated pose. The view synthesis module 508 may also be referred to as a scene reconstruction network. The view synthesis module 508 may be trained on the difference between the target image 502 and the reconstructed image 510. The network may be trained to minimize the loss, such as a photometric loss 520.

The photometric loss 520 is calculated based on the difference between the target image 502 and the reconstructed image 510 (e.g., the warped source image that approximates the target image). The photometric loss 520 may be used to update the depth network 300, the view synthesis module 508, the pose network 400, and/or the weights of pixels.

The photometric loss 520 ($L_p$) may be determined as follows:

$$L_p(I_t, \hat{I}_t) = \alpha \frac{1 - SSIM(I_t, \hat{I}_t)}{2} + (1 - \alpha)\|I_t - \hat{I}_t\|, \quad (1)$$

where SSIM( ) is a function for estimating a structural similarity (SSIM) between the target image 502 and the reconstructed image 510. SSIM may be determined as follows:

$$SSIM(x,y) = [l(x,y)]^{\alpha} \cdot [c(x,y)]^{\beta} \cdot [s(x,y)]^{\gamma}, \quad (2)$$

where s( ) determines a structure similarity, c( ) determines a contrast similarity, and l( ) determines a luminance similarity. $\alpha$, $\beta$, and $\gamma$ are parameters for adjusting a relative importance of each component, and each parameter is greater than zero.

During a testing stage, the training pipeline 500 may generate the reconstructed image 510 as described above. The photometric loss 516 may not be calculated during a testing stage. The reconstructed image 510 may be used for localization and/or other vehicle navigation tasks.

For example, the view estimation module 508 may project each point (e.g., pixel) in the current image 502 to a location of the source image 506 based on the estimated depth 506 and the sensor pose. After projecting the point to the source image 504, bilinear interpolation may be used to warp the point to the warped source image 510. That is, bilinear interpolation obtains the values (e.g., RGB values) of the point in the warped source image 510 based on the source image 504.

That is, the location (e.g., x, y coordinates) of the point in the warped source image 510 may correspond to the location of the point in the target image 502. Still, the color of the point in the warped source image 510 may be based on the colors of neighboring pixels in the source image 504. The warped source image 510 may be a 3D reconstruction of a 2D target image.

In some implementations, a 3D object detection network 518 may estimate a location of an object 514 in the warped source image 510. A location of the object 514 may be annotated with a 3D bounding box 512. For illustrative purposes, the 3D bounding box 512 in FIG. 5 is shown as a 2D bounding box. In one configuration, the 3D bounding box 512 is projected back to the current image 502. A 2D bounding box 516 may be generated from the projected 3D bounding box 512. A different weight may be applied to the pixels that fall within the 2D bounding box. For example, the weight may be increased, such that the pixels that fall within the 2D bounding box contribute more to the depth estimates in comparison to pixels with a lower weight. In one implementation, a pixel with an increased weight has a greater contribution for minimizing a loss, during training, comparison to a pixel with a decreased weight.

The processes discussed for supervised and self-supervised training are performed for semi-supervised training. In some implementations, an additional weight balances the supervised and self-supervised training processes. In some implementation, multiple passes may be performed during a training phase, each pass may be performed with different parameter values (e.g., weights). Performance (e.g., accuracy) is measured after each pass. Weights may be ordered based on a magnitude of loss and adjusted (e.g., improved) accordingly.

Pixelation may be caused by a supervised loss. A self-supervised loss mitigates the pixelation. Scale-inaccuracies may be caused by the self-supervised loss. The supervised loss mitigates scale inaccuracies. The additional weight may reduce a pixelation of a depth map that may be caused by the supervised loss. The additional weight may also reduce the scale-inaccuracies of a depth map caused by the supervised depth error loss.

In one configuration, when determining a pixel weight adjustment, the network determines a total number of valid pixels (NVP). A valid pixel refers to a pixel with corresponding ground-truth depth information or pixel with a valid reprojected value when using the photometric loss. For example, for supervised training, the neural networks identifies pixels in the image that have depth information in the ground-truth depth image.

Additionally, the network determines a number of valid pixels with the bounding boxes (NBP). The weight for valid pixels with the bounding boxes is determined based on the following pixel ratio: ((NVP−NBP)/NBP). For example, if an image includes 100,000 valid pixels and 2000 are within the bounding boxes, the weight for the pixels in the bounding boxes will be 49 (e.g., (100000−2000)/2000). In this example, the weight outside the bounding box is normalized to one. In contrast, the weight inside the bounding boxes is determined as the described ratio (49) (e.g., NVP−NBP)/NBP) This pixel ratio varies from image to image.

The pixel ratio still enables learning in areas that do not belong to bounding boxes, such that a structure and geometry of the scene are preserved. If bounding boxes are not annotated in a particular image, the weight is zero and is not applied to any pixels. As such, aspects of the present disclosure may train a depth network from images with and without annotated 3D bounding boxes, thereby improving the robustness of the training data.

As described, the ground-truth points may be obtained from 3D bounding box information. Detection of the first set of objects by the neural network (e.g., depth estimation neural network) may be improved due to the weight adjustments. The improved detection may come at the expense of detection of the second set of objects. That is, decreasing a detection accuracy for the second set of objects improves a detection accuracy for the first set of objects. In one aspect, models for a downstream task of 3D object detection are improved.

Figure 6:
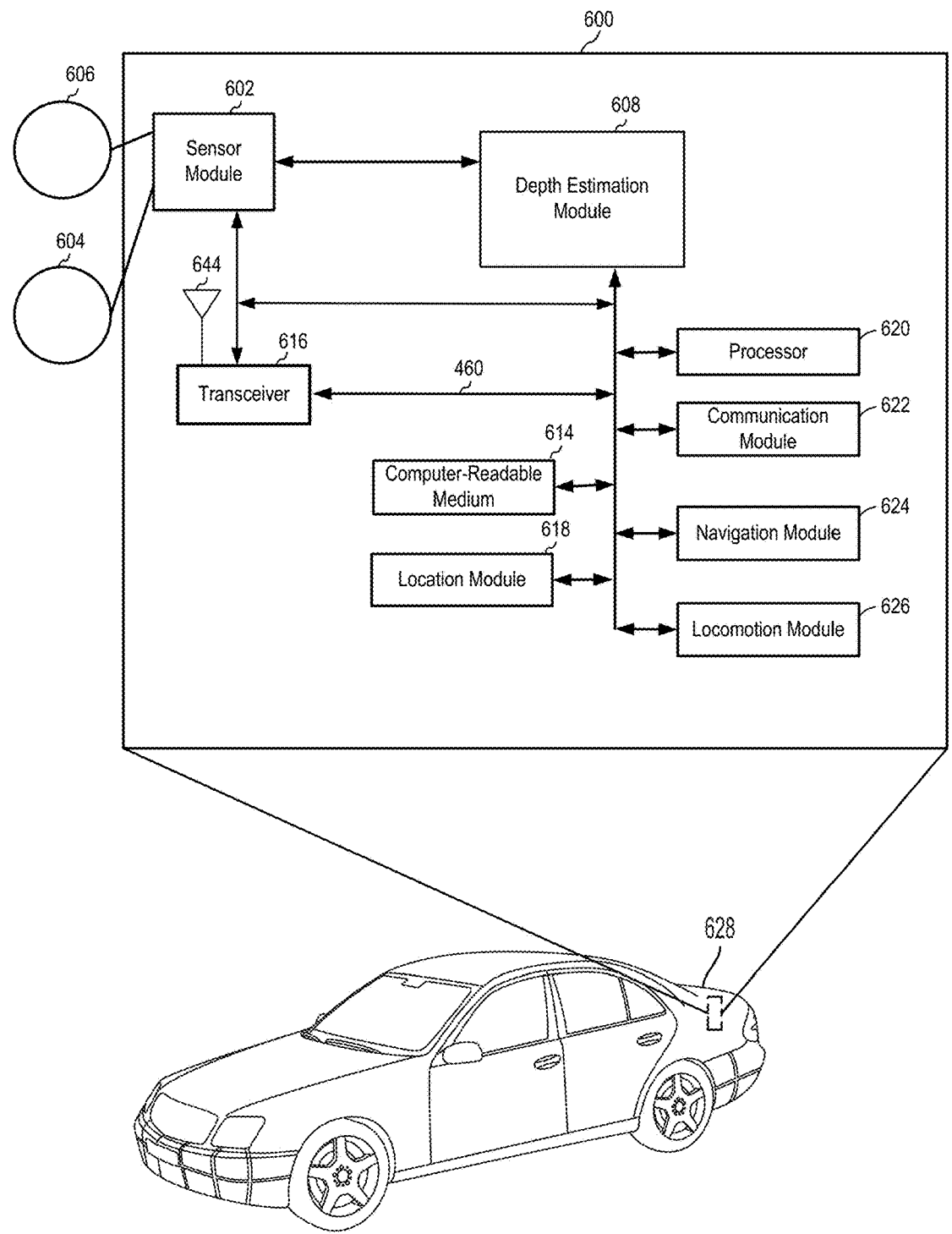
FIG. 6 is a diagram illustrating an example of a hardware implementation for a depth estimation system according to aspects of the present disclosure.

FIG. 6 is a diagram illustrating an example of a hardware implementation for a depth estimation system 600, according to aspects of the present disclosure. The depth estimation network 600 may be a component of a vehicle, a robotic device, or another device. For example, as shown in FIG. 6, the depth estimation network 600 is a component of a vehicle 628. Aspects of the present disclosure are not limited to the depth estimation network 600 being a component of the vehicle 628, as other types of agents, such as a bus, boat, drone, or robot, are also contemplated for using the depth estimation network 600.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The depth estimation network 600 may be implemented with a bus architecture, represented generally by a bus 660. The bus 660 may include any number of interconnecting buses and bridges depending on the specific application of the depth estimation network 600 and the overall design constraints. The bus 660 links together various circuits including one or more processors and/or hardware modules, represented by a processor 620, a communication module 622, a location module 618, a sensor module 602, a locomotion module 626, a navigation module 626, and a computer-readable medium 616. The bus 660 may also link various other circuits such as timing sources, peripherals, voltage regulators, and power management circuits, which are well known in the art, and therefore, will not be described any further.

The depth estimation network 600 includes a transceiver 616 coupled to the processor 620, the sensor module 602, a depth estimation module 608, the communication module 622, the location module 618, the locomotion module 626, the navigation module 626, and the computer-readable medium 616. The transceiver 616 is coupled to an antenna 666. The transceiver 616 communicates with various other devices over one or more communication networks, such as an infrastructure network, a V2V network, a V2I network, a V2X network, a V2P network, or another type of network.

The depth estimation network 600 includes the processor 620 coupled to the computer-readable medium 616. The processor 620 performs processing, including the execution of software stored on the computer-readable medium 616 providing functionality according to the disclosure. The software, when executed by the processor 620, causes the depth estimation network 600 to perform the various functions described for a particular device, such as the vehicle 628, or any of the modules 602, 608, 614, 616, 618, 620, 622, 624, 626. The computer-readable medium 616 may also be used for storing data that is manipulated by the processor 620 when executing the software.

The sensor module 602 may be used to obtain measurements via different sensors, such as a first sensor 606 and a second sensor 606. The first sensor 606 may be a vision sensor, such as a stereoscopic camera or a red-green-blue (RGB) camera, for capturing 2D images. The second sensor 606 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 606, 606.

The measurements of the first sensor 606 and the second sensor 606 may be processed by one or more of the processor 620, the sensor module 602, the depth estimation module 608, the communication module 622, the location module 618, the locomotion module 626, the navigation module 626, in conjunction with the computer-readable medium 616 to implement the functionality described herein. In one configuration, the data captured by the first sensor 606 and the second sensor 606 may be transmitted to an external device via the transceiver 616. The first sensor 606 and the second sensor 606 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 6G, etc. The communication module 622 may also be used to communicate with other components of the vehicle 628 that are not modules of the depth estimation network 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The depth estimation network 600 also includes the navigation module 626 for planning a route or controlling the locomotion of the vehicle 628, via the locomotion module 626. In one configuration, the navigation module 626 engages a defensive driving mode when the depth estimation module 608 identifies a risky agent. The navigation module 626 may override user input when the user input is expected (e.g., predicted) to cause a collision. The modules may be software modules running in the processor 620, resident/stored in the computer-readable medium 616, one or more hardware modules coupled to the processor 620, or some combination thereof.

The depth estimation module 608 may be in communication with the sensor module 602, the transceiver 616, the processor 620, the communication module 622, the location module 618, the locomotion module 626, the navigation module 626, and the computer-readable medium 616. In one configuration, the depth estimation module 608 receives sensor data from the sensor module 602. The sensor module 602 may receive the sensor data from the first sensor 606 and the second sensor 606. According to aspects of the present disclosure, the sensor module 602 may filter the data to remove noise, encode the data, decode the data, merge the data, extract frames, or perform other functions. In an alternate configuration, the depth estimation module 608 may receive sensor data directly from the first sensor 606 and the second sensor 606.

In one configuration, the depth estimation module 608 may be in communication and/or work in conjunction with one or more of the sensor module 602, the transceiver 616, the processor 620, the communication module 622, the location module 618, the locomotion module 626, the navigation module 624, the first sensor 606, the second sensor 604 and the computer-readable medium 614. The depth estimation module 608 may be configured for receiving a two-dimensional (2D) image of an environment adjacent to an ego vehicle. The environment includes a dynamic object and a static object. The 2D image may be captured by the first sensor 606 or the second sensor 606.

The depth estimation module 608 may be configured for generating a depth map of the environment based on the 2D image. In one implementation, accuracy of a depth estimate for the dynamic object in the depth map is greater than an accuracy of a depth estimate for the static object in the depth map. The depth estimation module 608 may work in conjunction with a view synthesis module (not shown in FIG. 6), such as the view synthesis module 508 described for FIG. 5, to generate a three-dimensional (3D) estimate of the environment based on the depth map. Additionally, working in conjunction with a 3D object detection network (not shown in FIG. 6), such as 3D object detection network 518 described for FIG. 5, the depth estimation module 608 may identify a location of the dynamic object in the 3D estimate. Finally, working in conjunction with, at least, the location module 618, the locomotion module 626, the navigation module 624, the depth estimation module 608 may control an action of the ego vehicle based on the identified location.

The depth estimation module 608 may implement a depth network, such as the depth network 300 described in reference to FIG. 3, a pose network, such as the pose network 400 described in reference to FIG. 4, the view synthesis module, and/or the 3D object detection network.

Figure 7:
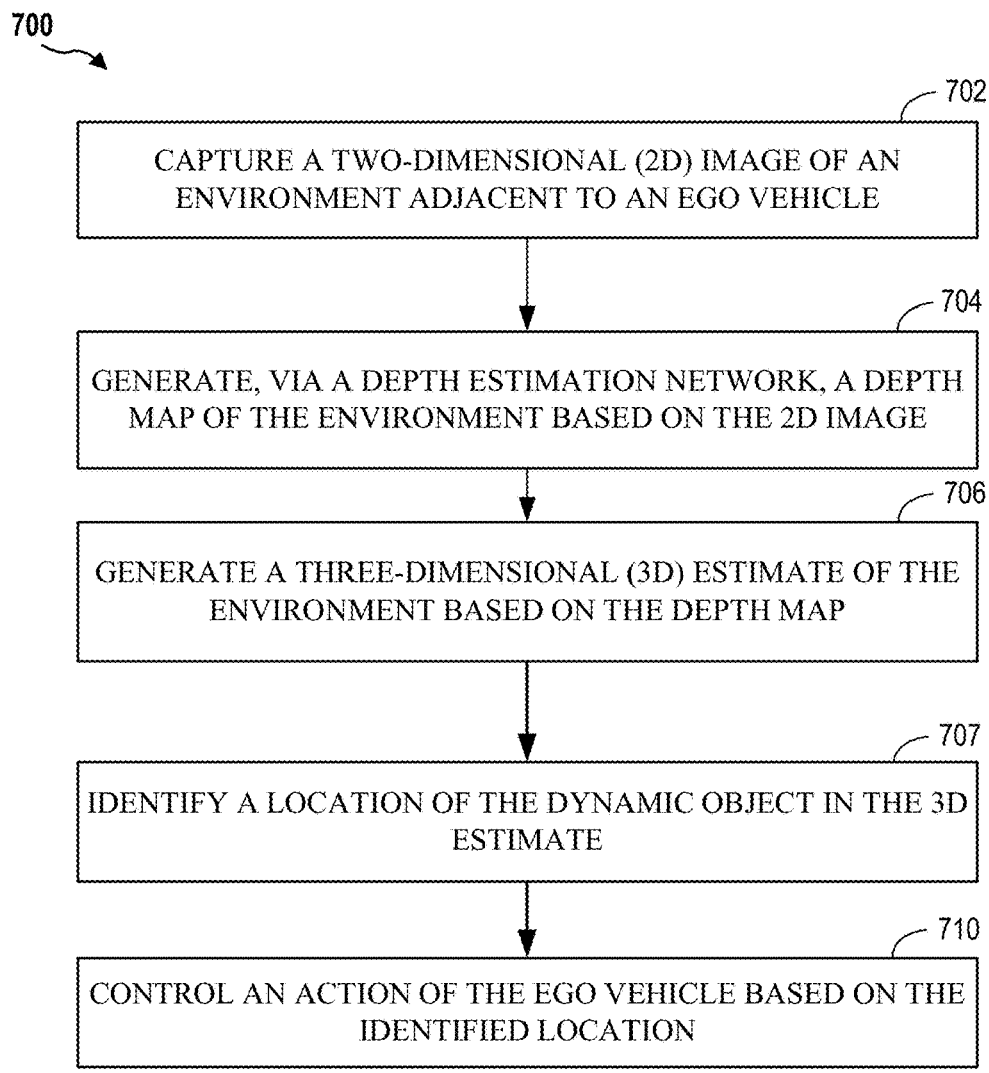
FIG. 7 illustrates a flow diagram for a method according to aspects of the present disclosure.

FIG. 7 illustrates a flow diagram for a process 700 for identifying objects and controlling a vehicle based on depth estimates, in accordance with aspects of the present disclosure. The process 700 may be performed by one or more of a vehicle, such as the vehicle 100 described with reference to FIG. 1, a depth network, such as the depth network 300 described with reference to FIG. 3, a depth estimation module 608 as described with reference to FIG. 6, pose network 400 as described for FIG. 4, and/or the training pipeline 500 as described with reference to FIG. 5.

As shown in FIG. 7, the process 700 includes capturing a two-dimensional (2D) image of an environment adjacent to an ego vehicle. The 2D image may be a target image 200 of a scene 202 as described with reference to FIG. 2. The environment may include a dynamic object and a static object (block 702). The environment may include one or more dynamic objects, such as vehicles, pedestrians, and/or cyclists. The environment may also include one or more static objects, such as a road, sidewalk, and/or building. The 2D image may be captured via a monocular camera integrated with the ego vehicle.

The process 700 may also include generating, via a depth estimation network, a depth map of the environment based on the 2D image (block 704). The depth map may be a depth map 220 of the scene 202 as described with reference to FIG. 2. In one implementation, an accuracy of a depth estimate for the dynamic object in the depth map being greater than an accuracy of a depth estimate for the static object in the depth map. The accuracy may be greater based on the training, as described, for example, with reference to FIG. 5.

For example, during training, a weight of each pixel corresponding to the location of the object in the 2D image may be adjusted. The depth estimation network (e.g., depth network) may be trained based on ground-truth information and the adjusted weights. Additionally, during training, the location of the dynamic object may be identified based on annotated ground truth information. For example, the location may be identified based on a 3D bounding box identifying a location of the object in 3D estimate. During training, the 3D bounding box may be converted to a 2D bounding box to identify the location of the object in the 2D image.

Additionally, in this example, the weight may be adjusted based on a first number of pixels comprising depth information and a number of pixels corresponding to the location of the object in the 2D image. Alternatively, the weight may be adjusted based on a photometric loss and a supervised depth error loss. The photometric loss may be the photometric loss 520 as described with reference to FIG. 5.

The process 700 may also include generating a 3D estimate of the environment is generated based on the depth map (block 706). The 3D estimate may be a reconstructed image (e.g., warped source image), such as the reconstructed image 510 described with reference to FIG. 5, or the 3D reconstruction 240 of the scene 202 as described with reference to FIG. 2. The process 700 also includes identifying a location of the dynamic object in the 3D estimate (block 708). Finally, the process 700 includes controlling an action of the ego vehicle based on the identified location.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for navigating a vehicle through an environment, comprising:
   assigning a first weight to each pixel associated with a dynamic object in a two-dimensional (2D) image of the environment;
   assigning a second weight to each pixel associated with a static object in the 2D image, the first weight being greater than the second weight;
   generating a dynamic object depth estimate for the dynamic object, the dynamic object depth estimate being associated with a first accuracy that is based on the first weight;
   generating a static object depth estimate for the static object, the static object depth estimate being associated with a second accuracy that is based on the second weight, the first accuracy of the dynamic object depth estimate being greater than the second accuracy of the static object depth estimate;
generating a three-dimensional (3D) estimate of the environment based on the dynamic object depth estimate and the static object depth estimate; and
controlling an action of the vehicle based on the 3D estimate of the environment.

2. The method of claim 1, in which:
the dynamic object comprises a pedestrian, a neighboring vehicle, or a cyclist; and
the static object comprises a road, a sidewalk, or a building.

3. The method of claim 1, wherein:
the dynamic object depth estimate and the static object depth estimation are determined via a depth estimation network; and
the method further comprises training the depth estimation network of the vehicle by:
adjusting a training weight of each pixel associated with the dynamic object in the 2D image; and
training the depth estimation network based on ground-truth information and the adjusted training weight of each pixel associated with the dynamic object.

4. The method of claim 1, further comprising:
indicating a prior location of the dynamic object in a prior 3D estimate of the environment via a 3D bounding box;
converting the 3D bounding box to a 2D bounding box; and
identifying a current location of the dynamic object in the 2D image based on the 2D bounding box.

5. The method of claim 1, further comprising adjusting the first weight of each pixel associated with the dynamic object based on a first number of pixels comprising depth information and a second number of pixels corresponding to a location of the dynamic object in the 2D image.

6. The method of claim 1, further comprising adjusting the first weight of each pixel associated with the dynamic object based on a photometric loss and a supervised depth error loss.

7. The method of claim 1, further comprising capturing the 2D image via a monocular camera integrated with the vehicle.

8. An apparatus for navigating a vehicle through an environment, comprising:
a processor; and
a memory coupled with the processor and storing instructions operable, when executed by the processor, to cause the apparatus to:
assign a first weight to each pixel associated with a dynamic object in a two-dimensional (2D) image of the environment;
assign a second weight to each pixel associated with a static object in the 2D image, the first weight being greater than the second weight;
generate a dynamic object depth estimate for the dynamic object, the dynamic object depth estimate being associated with a first accuracy that is based on the first weight;
generate a static object depth estimate for the static object, the static object depth estimate being associated with a second accuracy that is based on the second weight, the first accuracy of the dynamic object depth estimate being greater than the second accuracy of the static object depth estimate;
generate a three-dimensional (3D) estimate of the environment based on the dynamic object depth estimate and the static object depth estimate; and
control an action of the vehicle based on the 3D estimate of the environment.

9. The apparatus of claim 8, in which:
the dynamic object comprises a pedestrian, a neighboring vehicle, or a cyclist; and
the static object comprises a road, a sidewalk, or a building.

10. The apparatus of claim 8, wherein:
the dynamic object depth estimate and the static object depth estimation are determined via a depth estimation network; and
execution of the instructions further cause the apparatus to train the depth estimation network of the vehicle by:
adjusting a training weight of each pixel associated with the dynamic object in the 2D image; and
training the depth estimation network based on ground-truth information and the adjusted training weight of each pixel associated with the dynamic object.

11. The apparatus of claim 8, execution of the instructions further cause the apparatus to:
indicate a prior location of the dynamic object in a prior 3D estimate of the environment via a 3D bounding box;
convert the 3D bounding box to a 2D bounding box; and
identify a current location of the dynamic object in the 2D image based on the 2D bounding box.

12. The apparatus of claim 8, execution of the instructions further cause the apparatus to adjust the first weight of each pixel associated with the dynamic object based on a first number of pixels comprising depth information and a second number of pixels corresponding to a location of the dynamic object in the 2D image.

13. The apparatus of claim 8, execution of the instructions further cause the apparatus to adjust the first weight of each pixel associated with the dynamic object based on a photometric loss and a supervised depth error loss.

14. The apparatus of claim 8, execution of the instructions further cause the apparatus to capture the 2D image via a monocular camera integrated with the vehicle.

15. A non-transitory computer-readable medium having program code recorded thereon for navigating a vehicle through an environment, the program code executed by a processor and comprising:
program code to assign a first weight to each pixel associated with a dynamic object in a two-dimensional (2D) image of the environment;
program code to assign a second weight to each pixel associated with a static object in the 2D image, the first weight being greater than the second weight;
program code to generate a dynamic object depth estimate for the dynamic object, the dynamic object depth estimate being associated with a first accuracy that is based on the first weight;
program code to generate a static object depth estimate for the static object, the static object depth estimate being associated with a second accuracy that is based on the second weight, the first accuracy of the dynamic object depth estimate being greater than the second accuracy of the static object depth estimate;
program code to generate a three-dimensional (3D) estimate of the environment based on the dynamic object depth estimate and the static object depth estimate; and
program code to control an action of the vehicle based on the 3D estimate of the environment.

16. The non-transitory computer-readable medium of claim 15, in which:
the dynamic object comprises a pedestrian, a neighboring vehicle, or a cyclist; and the static object comprises a road, a sidewalk, or a building.

17. The non-transitory computer-readable medium of claim 15, wherein the program code further comprises:
program code to indicate a prior location of the dynamic object in a prior 3D estimate of the environment via a 3D bounding box;
program code to convert the 3D bounding box to a 2D bounding box; and
program code to identify a current location of the dynamic object in the 2D image based on the 2D bounding box.

18. The non-transitory computer-readable medium of claim 15, wherein the program code further comprises program code to adjust the first weight of each pixel associated with the dynamic object based on a first number of pixels comprising depth information and a second number of pixels corresponding to a location of the dynamic object in the 2D image.

19. The non-transitory computer-readable medium of claim 15, wherein the program code further comprises program code to adjust the first weight of each pixel associated with the dynamic object based on a photometric loss and a supervised depth error loss.

20. The non-transitory computer-readable medium of claim 15, wherein the program code further comprises program code to capture the 2D image via a monocular camera integrated with the vehicle.

\* \* \* \* \*